United States Patent
Bergström et al.

(10) Patent No.: US 9,907,013 B2
(45) Date of Patent: Feb. 27, 2018

(54) INTERWORKING BETWEEN NETWORKS OPERATING ACCORDING TO DIFFERENT RADIO ACCESS TECHNOLOGIES

(71) Applicant: Telefonaktiebolaget L M Ericsson (publ), Stockholm (SE)

(72) Inventors: Mattias Tan Bergström, Stockholm (SE); Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/421,910

(22) PCT Filed: Jan. 16, 2015

(86) PCT No.: PCT/SE2015/050040
§ 371 (c)(1),
(2) Date: Feb. 16, 2015

(87) PCT Pub. No.: WO2015/115966
PCT Pub. Date: Aug. 6, 2015

(65) Prior Publication Data
US 2016/0029296 A1 Jan. 28, 2016

Related U.S. Application Data

(60) Provisional application No. 61/934,076, filed on Jan. 31, 2014.

(51) Int. Cl.
*H04W 48/08* (2009.01)
*H04W 76/02* (2009.01)
(Continued)

(52) U.S. Cl.
CPC ........... *H04W 48/08* (2013.01); *H04W 48/12* (2013.01); *H04W 76/026* (2013.01);
(Continued)

(58) Field of Classification Search
CPC ..................................................... H04W 8/245
See application file for complete search history.

(56) References Cited

U.S. PATENT DOCUMENTS

2013/0143542 A1* 6/2013 Kovvali ............... H04W 48/18
455/418
2013/0242783 A1 9/2013 Horn et al.
(Continued)

FOREIGN PATENT DOCUMENTS

RU 2012123966 A 12/2013

OTHER PUBLICATIONS

Unknown, Author, "Discussion on three solutions for access network selection", ZTE, 3GPP TSG-RAN WG2 Meeting #83 bis, R2-133144, Ljubljana, Slovenia, Oct. 7-11, 2013, 1-5.
(Continued)

*Primary Examiner* — Michael T Vu
(74) *Attorney, Agent, or Firm* — Murphy, Bilak & Homiller, PLLC

(57) ABSTRACT

There is provided a method of operating a terminal device in a first network that is operating according to a first radio access technology, RAT, the terminal device supporting and operating according to a network interworking feature that enables and controls interworking between the first network and a network operating according to a second RAT, the method comprising determining whether a first cell in the first network that is serving the terminal device supports the network interworking feature (1101); and modifying the operation of the terminal device with respect to the network interworking feature if it is determined that the first cell does not support the network interworking feature (1103).

14 Claims, 7 Drawing Sheets

(51) Int. Cl.
*H04W 48/12* (2009.01)
*H04W 28/08* (2009.01)
*H04W 48/20* (2009.01)
*H04W 84/12* (2009.01)
*H04W 88/06* (2009.01)

(52) U.S. Cl.
CPC ............ *H04W 28/08* (2013.01); *H04W 48/20* (2013.01); *H04W 84/12* (2013.01); *H04W 88/06* (2013.01)

(56) References Cited

U.S. PATENT DOCUMENTS

| | | | |
|---|---|---|---|
| 2015/0049707 A1* | 2/2015 | Vajapeyam | H04W 24/10 370/329 |
| 2016/0007268 A1* | 1/2016 | Jung | H04W 48/08 370/338 |

OTHER PUBLICATIONS

Unknown, Author, "Handling of the dedicated RAN assistance information", LG Electronics Inc., 3GPP TSG-RAN2 Meeting #85bis, R2-141702, Valencia, Spain, Mar. 31-Apr. 4, 2014, 1-3.

Unknown, Author, "RAN assistance parameter handling", Ericsson, 3GPP TSG-RAN WG2 #87, Tdoc R2-143320, Dresden, Germany, Aug. 18-22, 2014, 1-5.

3GPP, "3rd Generation Partnership Project; Technical Specification Group Radio Access Network; Evolved Universal Terrestrial Radio Access (E-UTRA)and Evolved Universal Terrestrial Radio Access Network (E-UTRAN); Overall description; Stage 2 (Release 11)", 3GPP TS 36.300 V11.3.0, Sep. 2012, 1-205.

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.3.0, Sep. 2014, 1-378.

3GPP, "3rd Generation Partnership Project; Technical Specification Group Radio Access Network; Evolved Universal Terrestrial Radio Access (E-UTRA); User Equipment (UE) procedures in idle mode (Release 11)", 3GPP TS 36.304 V11.6.0, Dec. 2013, 1-34.

3GPP, "3rd Generation Partnership Project; Technical Specification Group Radio Access Network; User Equipment (UE) procedures in idle mode and procedures for cell reselection in connected mode (Release 12)", 3GPP TS 25.304 V12.0.0, Dec. 2013, 1-54.

3GPP, "3rd Generation Partnership Project; Technical Specification Group Services and System Aspects; Architecture enhancements for non-3GPP accesses (Release 11)", 3GPP TS 23.402 V11.4.0, Sep. 2012, 1-252.

Unknown, Author, "Text proposal on WLAN3GPP radio interworking solution 2", LG Electronics Inc., Kyocera, 3GPP TSG-RAN2 Meeting #82, R2-132193, Fukuoka, Japan May 20-24, 2013, 1-3.

* cited by examiner

INTERWORKING BETWEEN NETWORKS OPERATING ACCORDING TO DIFFERENT RADIO ACCESS TECHNOLOGIES

TECHNICAL FIELD

The present disclosure relates generally to wireless communication systems and is more particularly related to techniques for controlling the operation of terminal devices with respect to networks operating according to different radio access technologies, RATs, such as a wide area communication technology standardised by the 3$^{rd}$ Generation Partnership Project (3GPP) and a wireless local area network (WLAN) technology.

BACKGROUND

The wireless local-area network (WLAN) technology known as "Wi-Fi" has been standardised by IEEE in the 802.11 series of specifications (i.e., as "IEEE Standard for Information technology—Telecommunications and information exchange between systems. Local and metropolitan area networks—Specific requirements. Part 11: Wireless LAN Medium Access Control ( MAC) and Physical Layer ( PHY) Specifications"). As currently specified, Wi-Fi systems are primarily operated in the 2.4 GHz and 5 GHz bands. The terms "Wi-Fi" and "WLAN" are used interchangeably throughout this application.

The IEEE 802.11 specifications regulate the functions and operations of the Wi-Fi access points or wireless terminals, collectively known as "stations" or "STA," in the IEEE 802.11, including the physical layer protocols, Medium Access Control (MAC) layer protocols, and other aspects needed to secure compatibility and inter-operability between access points and portable terminals. Because Wi-Fi is generally operated in unlicensed bands, communication over Wi-Fi may be subject to interference sources from any number of both known and unknown devices. Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular radio access network technologies. Cellular operators that are currently serving mobile users with, for example, any of the technologies standardised by the 3rd-Generation Partnership Project (3GPP), including the radio-access technologies known as Long-Term Evolution (LTE), Universal Mobile Telecommunications System (UMTS)/Wideband Code-Division Multiple Access (WCDMA), High Speed Packet Access (HSPA) and Global System for Mobile Communications (GSM), see Wi-Fi as a wireless technology that can provide good additional support for users in their regular cellular networks.

As used herein, the term "operator-controlled Wi-Fi" indicates a Wi-Fi deployment that on some level is integrated with a cellular network operator's existing network, where the operator's radio access network(s) and one or more Wi-Fi wireless access points may even be connected to the same core network (CN) and provide the same or overlapping services. The term "Wi-Fi offload" is commonly used in the efforts to standardise the integration of Wi-Fi to the cellular network and indicates that cellular network operators seek means to offload traffic from their cellular networks to Wi-Fi, e.g., during peak-traffic-hours and in situations when the cellular network needs to be off-loaded for one reason or another, e.g., to provide a requested quality-of-service, to maximize bandwidth, or simply for improved coverage.

Many of today's portable terminal devices (also referred to herein as "user equipments" or "UEs" or mobile devices or communication devices) support Wi-Fi in addition to one or several 3GPP cellular technologies. In many cases, however, these terminal devices essentially behave as two separate devices from a radio access perspective.

3GPP is currently working on specifying a feature or mechanism for WLAN/3GPP radio interworking which improves the control over how a terminal device (UE) steers traffic (e.g. data sessions, voice calls, etc.) between 3GPP radio access networks, RANs (i.e. cellular radio access networks operating according to a 3GPP-specified radio access technology) and WLANs belonging to the operator or its partners.

In this and related mechanisms, the RAN (e.g. the 3GPP-specified RAN or the WLAN RAN) should provide parameters to the terminal device which are used to perform 'access selection' (or 'access network selection') to decide which network (e.g. the 3GPP network or WLAN) the terminal device should connect to. When access selection has been completed there may be 'traffic steering' in which it is decided which traffic (e.g. which data sessions, etc.) should be routed over the 3GPP network and which should be routed over the WLAN.

3GPP has identified a few example parameters that could be used in this mechanism which include thresholds, traffic steering information and WLAN identifiers (e.g. service set identifiers, SSIDs).

The thresholds could be, for example, metrics such as LTE reference signal received power (RSRP), WLAN received channel power indicator (RCPI), etc, and a terminal device could be configured to connect to a WLAN if the LTE RSRP is below the signalled RSRP threshold at the same time that the WLAN RCPI is above the signalled RCPI threshold. 3GPP has also discussed that similar thresholds can be provided for steering traffic back from WLAN to a 3GPP network.

For the traffic steering part of the mechanism, it has been discussed that the 3GPP RAN (or some other part of the 3GPP network, such as a network node like a mobility management entity, MME) should indicate traffic steering information to the terminal device which could comprise, for example, the marking of particular bearers as to whether they should be offloaded to WLAN or kept in the 3GPP network.

The WLAN identifiers are provided in order to indicate to the terminal device which WLANs the terminal device can consider connecting to (e.g. WLANs operated by the 3GPP network operator).

The steering described above is intended to be used alone or in combination with an Access Network Discovery and Selection Function, when that function is deployed.

Access Network Discovery and Selection Function—The Access Network Discovery and Selection Function (ANDSF) is an entity defined by 3GPP for providing access discovery information as well as mobility and routing policies to the UE. ANDSF was an entity added to the 3GPP architecture in Release 8 of 3GPP TS 23.402 (See "Architecture Enhancements for non-3GPP Accesses," 3GPP TS 23.402, v. 11.4.0 (Sep. 2012), available at www.3gpp.org). A simplified ANDSF architecture is depicted in FIG. 1. As shown in the figure, an ANDSF server 10 is provided that is added to a 3GPP network that comprises one or more base stations 12 (known as eNBs in LTE networks) and a gateway (GW) 14. The ANDSF server 10 is connected to a terminal device 16, and its main goal is to provide the terminal device 16 with access network information in a resource efficient and secure manner. The communication between the terminal device 16 and the ANDSF server 10 is defined as an IP-based S14-interface 18.

By supplying information about both available 3GPP and non-3GPP access networks (e.g. WLANs) to the terminal device 16, the ANDSF server 10 enables an energy-efficient mechanism of network discovery, where the terminal device 16 can avoid continuous and energy-consuming background scanning. Furthermore, the ANDSF provides the mobile network operators with a tool for the implementation of flexible and efficient terminal device steering of access mechanisms, where policy control can guide terminal devices 16 to select one particular radio access network (RAN) over another.

SUMMARY

The upgrading of networks to support additional or new features is often done in stages where the network operator upgrades some base stations at a time, which means during the upgrading process some base stations will support a particular feature while other base stations will not. It may also be the case that the network operator will not actively support all of the base stations in the network, for example the network operator may upgrade only those base stations which would benefit the most from the upgrade. For example the network operator may upgrade their macrocell base stations to support all (or most) of the new features, while some micro/pico/femto base stations (e.g. base stations owned by residential or enterprise subscribers) are not upgraded. An upgrade may also be limited to certain radio access technologies, RATs, of the network. In addition, some networks cooperate as Equivalent Public Land Mobile Networks, PLMNs, where the terminal devices are able to move freely between the PLMNs, but the different PLMNs support different feature sets.

Due to the above, some of the base stations in a network may support the 3GPP/WLAN interworking feature or mechanism (e.g. as specified in a particular Release of the relevant 3GPP specifications) while other base stations may not support the 3GPP/WLAN interworking feature or mechanism. As a result, when a terminal device that does support the 3GPP/WLAN interworking feature or mechanism moves from being served by a base station that supports the 3GPP/WLAN interworking feature or mechanism to being served by a base station that does not support the 3GPP/WLAN interworking feature or mechanism, it may not always be feasible for the terminal device to continue operating according to the feature or mechanism. In particular, the feature or mechanism is to some extent dependent on parameters being provided from the network, which would not be provided to the terminal device when the terminal device is being served by a base station that does not support the feature. As a result, the behaviour of the terminal device could be unsuitable and may result in degraded user experience for the user of the terminal device itself, and also degraded system performance for some or all of other terminal devices being served by that base station or in use in the network.

Therefore, various embodiments are proposed that aim to mitigate this problem.

In particular, in some embodiments a terminal device determines whether the cell serving the terminal device supports the 3GPP/WLAN interworking feature. If the serving cell does not support the feature the terminal device will, according to some embodiments, stop acting according to the 3GPP/WLAN interworking feature and instead apply a default behaviour. In some other embodiments, if the serving cell does not support the feature the terminal device may continue to act according to the 3GPP/WLAN interworking feature subject to one or more conditions being met.

According to a first aspect, there is provided a method of operating a terminal device in a first network that is operating according to a first radio access technology, RAT, the terminal device supporting and operating according to a network interworking feature that enables and controls interworking between the first network and a network operating according to a second RAT, the method comprising determining whether a first cell in the first network that is serving the terminal device supports the network interworking feature; and modifying the operation of the terminal device with respect to the network interworking feature if it is determined that the first cell does not support the network interworking feature.

In some embodiments, the method further comprises continuing to operate according to the network interworking feature if it is determined that the first cell does support the network interworking feature.

In some embodiments the step of modifying the operation of the terminal device comprises disabling the network interworking feature or ceasing to act according to the network interworking feature.

In other embodiments the step of modifying the operation of the terminal device comprises using default settings or parameters for the network interworking feature.

In other embodiments the step of modifying the operation of the terminal device comprises continuing to operate according to the network interworking feature provided one or more conditions are met.

In some embodiments the step of determining whether a first cell in the first network that is serving the terminal device supports the network interworking feature is performed following a change in the serving cell of the terminal device from another cell in the first network.

According to a second aspect, there is provided a terminal device for use in a first network that is operating according to a first radio access technology, RAT, the terminal device supporting and operating according to a network interworking feature that enables and controls interworking between the first network and a network operating according to a second RAT, the terminal device comprising a processing circuit that is configured to: determine whether a first cell in the first network that is serving the terminal device supports the network interworking feature; and modify the operation of the terminal device with respect to the network interworking feature if it is determined that the first cell does not support the network interworking feature.

In some embodiments the processing circuit is further configured to continue to operate the terminal device according to the network interworking feature if it is determined that the first cell does support the network interworking feature.

In some embodiments the processing circuit is configured to modify the operation of the terminal device by disabling the network interworking feature or ceasing to act according to the network interworking feature.

In other embodiments the processing circuit is configured to modify the operation of the terminal device to use default settings or parameters for the network interworking feature.

In other embodiments the processing circuit is configured to modify the operation of the terminal device such that the terminal device continues to operate according to the network interworking feature provided one or more conditions are met.

In some embodiments the processing circuit is configured to determine whether the first cell in the first network that is serving the terminal device supports the network interworking feature following a change in the serving cell of the terminal device from another cell in the first network.

According to a third aspect there is provided a method of operating a network node in a first network that is operating according to a first radio access technology, RAT, the method comprising transmitting an indication to a terminal device, the indication relating to a network interworking feature that enables and controls interworking between the first network and a network operating according to a second RAT.

According to a fourth aspect, there is provided a network node for use in a first network that is operating according to a first radio access technology, RAT, the network node comprising a processing circuit that is configured to transmit an indication to a terminal device, the indication relating to a network interworking feature that enables and controls interworking between the first network and a network operating according to a second RAT.

According to a fifth aspect there is provided a computer program product having computer readable code embodied therein, the computer readable code being configured such that, on execution by a suitable processing circuit or computer, the processing circuit or computer is caused to perform any of the methods described above.

BRIEF DESCRIPTION OF THE DRAWINGS

Features, objects and advantages of the presently disclosed techniques will become apparent to those skilled in the art by reading the following detailed description where references will be made to the appended figures in which.

DETAILED DESCRIPTION

Figure 1:
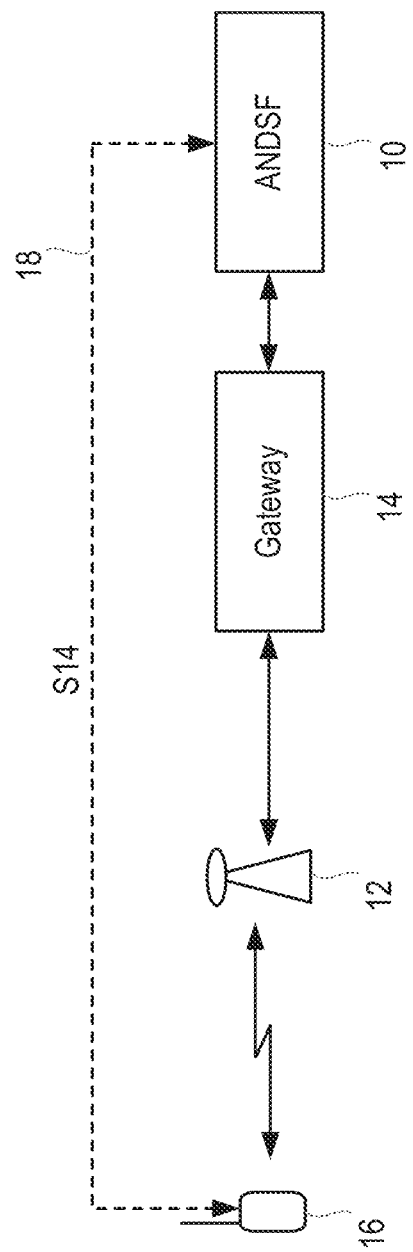
FIG. 1 is a block diagram of an exemplary ANDSF architecture.

In the discussion that follows, specific details of particular embodiments of the present teaching are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, application-specific integrated circuits (ASICs), programmable logic arrays (PLAs), digital signal processors (DSPs), reduced instruction set processors, field programmable gate arrays (FPGAs), state machines capable of performing such functions, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present teachings may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The discussion that follows frequently refers to "terminal devices", although other generally equivalent terms such as "mobile devices", "communication devices", "mobile stations" and particularly "UEs"—which is a 3GPP term for end user wireless devices—are also used. It should be appreciated, however, that the techniques and apparatus described herein are not limited to 3GPP UEs (i.e. UEs or terminal devices that are capable of operating according to one or more 3GPP standardised technologies), but are more generally applicable to end user wireless devices (e.g., portable cellular telephones, smartphones, wireless-enabled tablet computers, etc.) that are useable in cellular systems and that are capable of communicating with a radio access network (RAN) using one or multiple carriers or cells (e.g. known as a carrier aggregation (CA) mode in LTE). It should also be noted that the current disclosure relates to end user terminal devices that support both a wide-area cellular technology, such as any of the wide-area radio access standards maintained by 3GPP, and a wireless local area network (WLAN) technology, such as one or more of the IEEE 802.11 standards. End user devices are referred to in Wi-Fi document as "stations," or "STA"—it should be appreciated that the term "UE" or "terminal device" as used herein should be understood to refer to a STA, and vice-versa, unless the context clearly indicates otherwise. It should also be noted that the current disclosure also relates to end user wireless devices that support both a wide-area cellular technology, such as any of the wide-area radio access standards maintained by 3GPP, and a non-3GPP standardized RAT, for which improvements to the selection of the access network and traffic steering are desired.

As used herein, a "base station" comprises in a general sense any node transmitting radio signals in the downlink (DL) to a terminal device and/or receiving radio signals in the uplink (UL) from the terminal device. Some example base stations are eNodeB, eNB, Node B, macro-/micro-/pico-/femto-cell radio base station, home eNodeB (also known as a femtocell base station), relay, repeater, sensor, transmitting-only radio nodes or receiving-only radio nodes. A base station may operate or at least perform measurements in one or more frequencies, carrier frequencies or frequency bands and may itself be capable of carrier aggregation. It may also be a single-radio access technology (RAT), multi-RAT, or multi-standard node, e.g., using the same or different base band modules for different RATs.

The signalling between the terminal devices and the network nodes (e.g. a base station or another node in the RAN or core network) described below is either via direct links or logical links (e.g. via higher layer protocols and/or via one or more other network nodes). For example, signalling from a coordinating node may pass another network node, e.g., a radio node.

Figure 2:
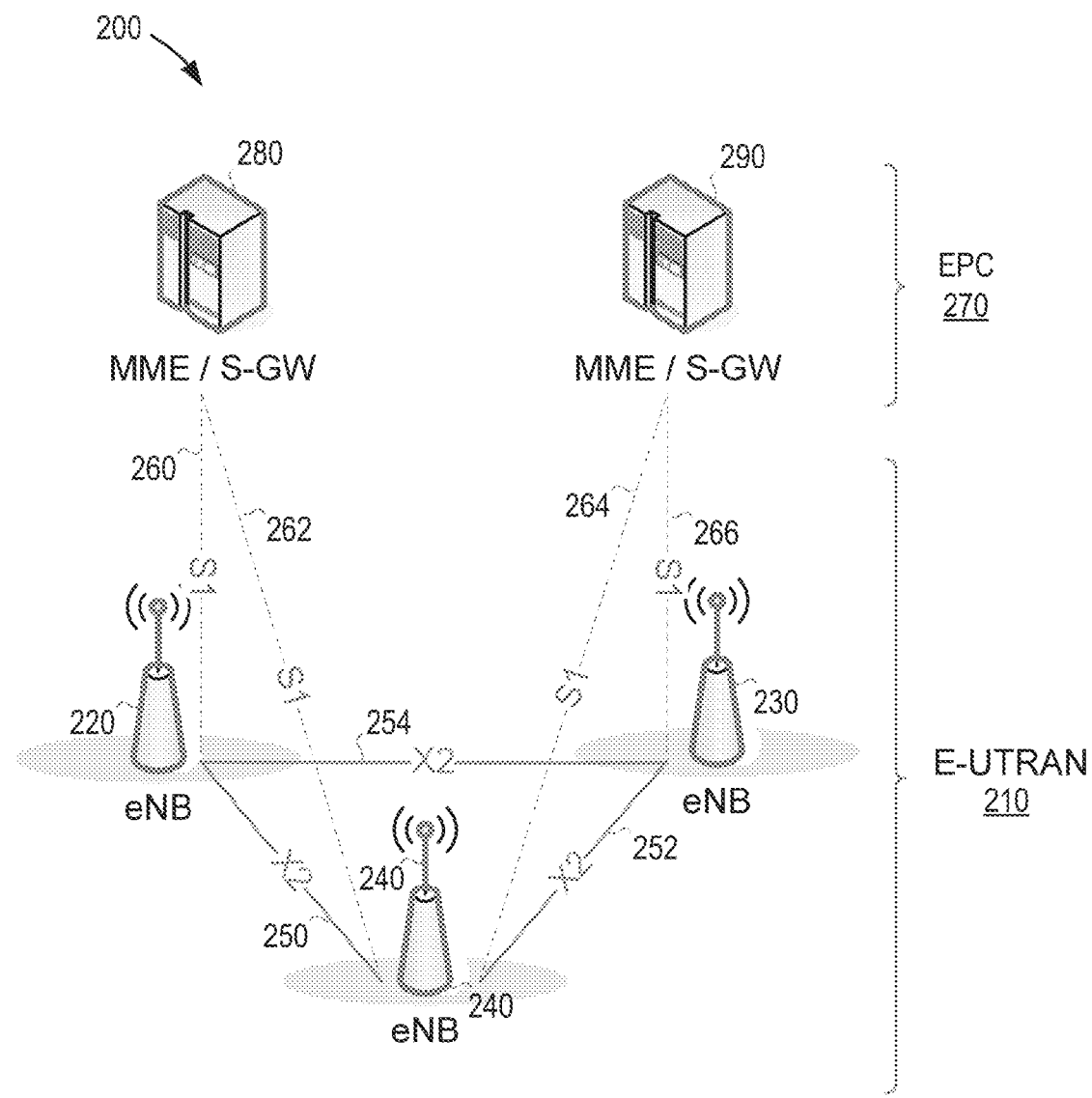
FIG. 2 is a diagram illustrating the overall architecture of an LTE network.

Overall E-UTRAN architecture—An exemplary Evolved UMTS (Universal Mobile Telecommunications System) Terrestrial Radio Access Network (E-UTRAN) architecture is shown in FIG. 2. The E-UTRAN architecture 210 consists of base stations 220, 230, 240 called enhanced NodeBs (eNBs or eNodeBs), which provide the E-UTRA user plane and control plane protocol terminations towards the User Equipment (UE). The eNBs 220, 230, 240 are interconnected with each other by means of the X2 interface 6. The eNBs 220, 230, 240 are also connected by means of the S1 interface 260, 262, 264, 266 to the EPC 270 (Evolved Packet Core), more specifically to the MME 280, 290 (Mobility Management Entity), by means of the S1-MME interface, and to the Serving Gateway 280, 290 (S-GW) by means of the S1-U interface. The S1 interface supports many-to-many relations between MMEs/S-GWs and eNBs.

The eNB 220, 230, 240 hosts functionalities such as Radio Resource Management (RRM), radio bearer control, admission control, header compression of user plane data towards the UE, and routing of user plane data towards the serving gateway. The MME 280, 290 is the control node that processes the signalling between the UE and the core network 270. The main functions of the MME 280, 290 are related to connection management and bearer management, which are handled via Non Access Stratum (NAS) protocols. The S-GW 280, 290 is the anchor point for UE mobility, and also includes other functionalities such as temporary downlink data buffering while the UE is being paged, packet routing and forwarding the right eNB 220, 230, 240, gathering of information for charging and lawful interception. The PDN (Packet Data Network) Gateway (P-GW—not shown in FIG. 2) is the node responsible for UE IP address allocation, as well as Quality of Service (QoS) enforcement. The 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (Sep. 2012), available at www.3gpp.org, and the references therein provide details of the functionalities of the different nodes shown in FIG. 2.

Figure 3:
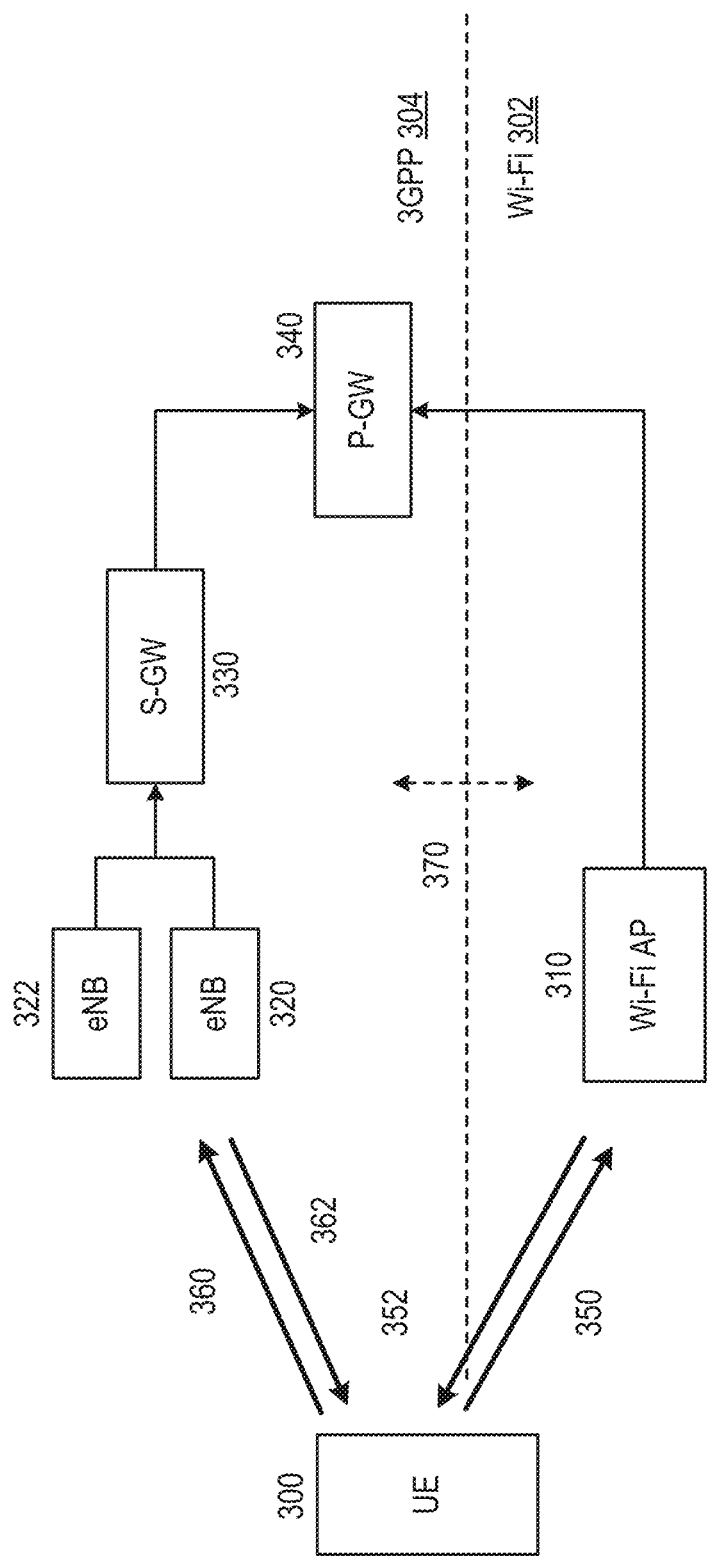
FIG. 3 illustrates part of a LTE network and a Wi-Fi network.

FIG. 3 illustrates a network where the LTE radio access parts (eNBs) 320, 322 and a Wi-Fi wireless access point 310 are both connected to the same P-GW 340. In the case of the LTE radio access parts, the eNBs 320, 322 are connected to the P-GW 340 via an S-GW 330. A UE 300 is shown that is capable of being served both from the Wi-Fi Access Point 310 and the LTE eNBs 320, 322. Arrows 350 and 352 illustrate the uplink (UL) and downlink (DL) transmissions between the UE 300 and the Wi-Fi AP 310 respectively and arrows 360 and 362 illustrate the uplink (UL) and downlink (DL) transmissions between the UE 300 and the eNBs respectively. FIG. 3 illustrates one possible way of connecting a Wi-Fi access network 302 to the same core network as the 3GPP-specified access network 304. The gateways (Trusted Wireless Access Gateway, TWAG, evolved Packet Data Gateway, ePDG, etc) between Wi-Fi AP and P-GW are omitted for simplicity. It should be noted that the presently disclosed techniques are not restricted to scenarios where the Wi-Fi access network 302 is connected in this way; the techniques can be applied to scenarios where the networks are more or completely separate.

In the following description of the various solutions provided by the present disclosure, the arrangement shown in FIG. 3 is used as a basis for the explanation, and references in the description below to a terminal device/UE, base station/eNB, 3GPP network/RAN/RAT, Wi-Fi AP and WLAN are to the UE 300, eNB 320, 3GPP network/RAN/RAT 304, Wi-Fi AP 310 and WLAN 302 shown in FIG. 3 respectively. However, it will be appreciated that the various solutions provided by the present disclosure are not limited to implementation in the arrangement shown in FIG. 3.

Figure 4:
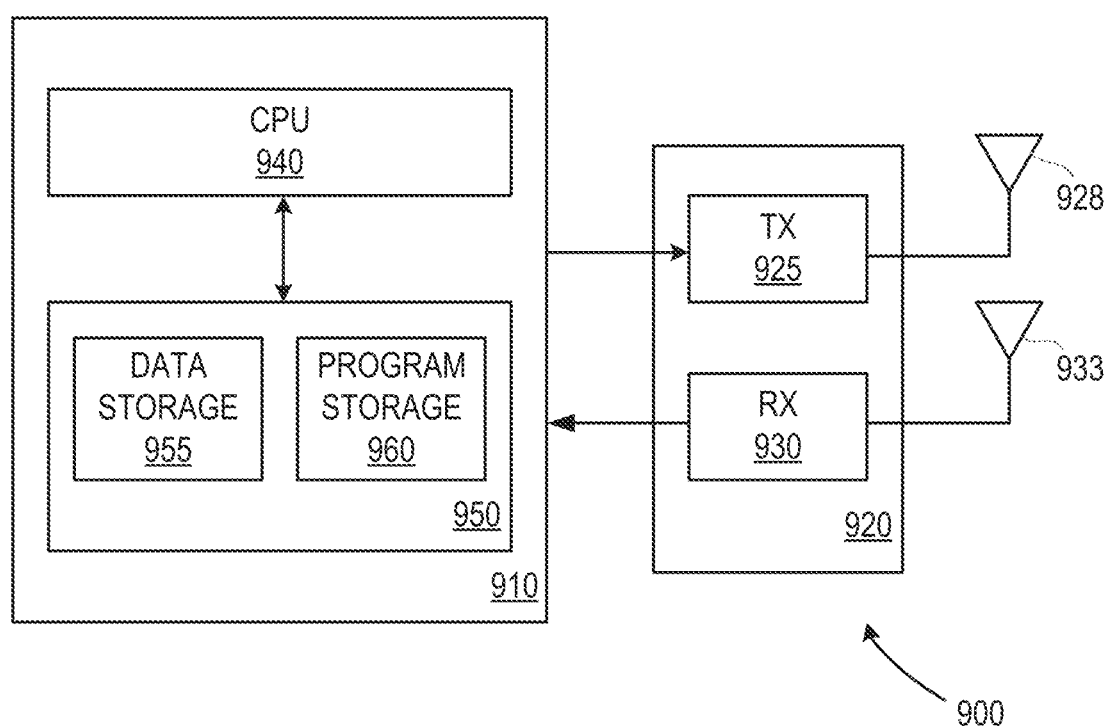
FIG. 4 is a block diagram of an exemplary terminal device according to several embodiments.

Hardware Implementations—Several of the techniques and methods described above may be implemented using radio circuitry and electronic data processing circuitry provided in a terminal device. FIG. 4 illustrates features of an example terminal device 900 according to several embodiments. Terminal device 900, which may be a UE configured for operation with an LTE network (E-UTRAN) and that also supports Wi-Fi, for example, comprises a transceiver unit 920 for communicating with one or more base stations (eNBs) as well as a processing circuit 910 for processing the signals transmitted and received by the transceiver unit 920. Transceiver unit 920 includes a transmitter 925 coupled to one or more transmit antennas 928 and receiver 930 coupled to one or more receiver antennas 933. The same antenna(s) 928 and 933 may be used for both transmission and reception. Receiver 930 and transmitter 925 use known radio processing and signal processing components and techniques, typically according to a particular telecommunications standard such as the 3GPP standards for LTE. Note also that transmitter unit 920 may comprise separate radio and/or baseband circuitry for each of two or more different types of radio access network, such as radio/baseband circuitry adapted for E-UTRAN access and separate radio/baseband circuitry adapted for Wi-Fi access. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the techniques described herein, additional details are not shown here.

Processing circuit 910 comprises one or more processors 940 coupled to one or more memory devices 950 that make up a data storage memory 955 and a program storage memory 960. Processor 940, identified as CPU 940 in FIG. 4, may be a microprocessor, microcontroller, or digital signal processor, in some embodiments. More generally, processing circuit 910 may comprise a processor/firmware combination, or specialized digital hardware, or a combination thereof. Memory 950 may comprise one or several types of memory such as read-only memory (ROM), random-access memory, cache memory, flash memory devices, optical storage devices, etc. Because terminal device 900 supports multiple radio access technologies, processing circuit 910 may include separate processing resources dedicated to one or several radio access technologies, in some embodiments. Again, because the various details and engineering tradeoffs associated with the design of baseband processing circuitry for mobile devices are well known and are unnecessary to a full understanding of the techniques described herein, additional details are not shown here.

Typical functions of the processing circuit 910 include modulation and coding of transmitted signals and the demodulation and decoding of received signals. In several embodiments, processing circuit 910 is adapted, using suitable program code stored in program storage memory 960, for example, to carry out any of the embodiments described below. Of course, it will be appreciated that not all of the steps of these embodiments are necessarily performed in a single microprocessor or even in a single module.

Figure 5:
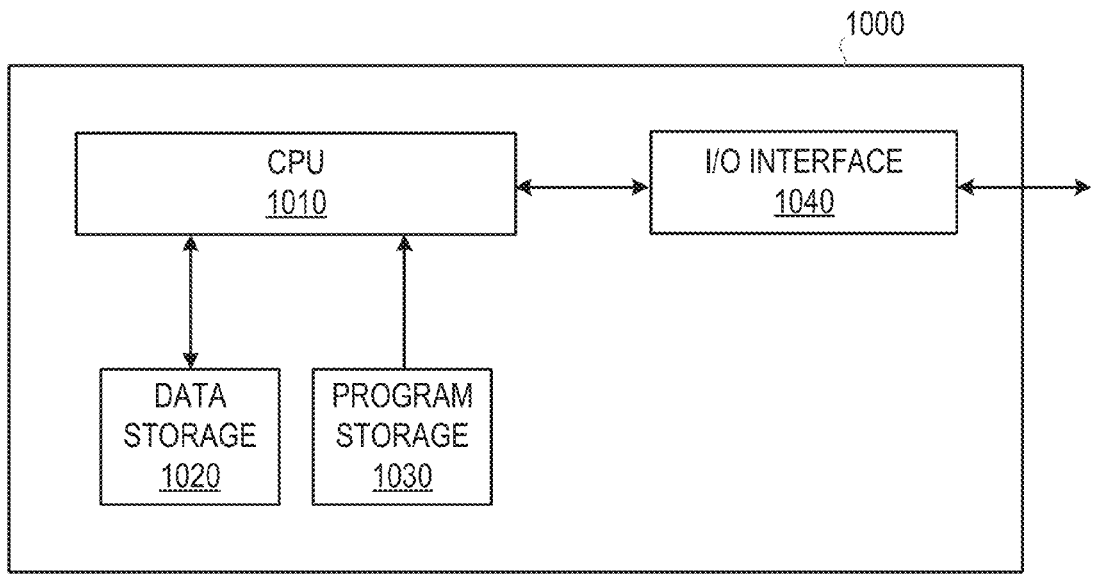
FIG. 5 is a block diagram of an exemplary network node according to several embodiments.

Similarly, several of the techniques and processes described above can be implemented in a network node, such as an eNodeB or other node in a 3GPP network. FIG. 5 is a schematic illustration of a node 1000 in which a method embodying any of the presently described network-based techniques can be implemented. A computer program for controlling the node 1000 to carry out a method according to any of the relevant embodiments is stored in a program storage 1030, which comprises one or several memory devices. Data used during the performance of a method according to the embodiments is stored in a data storage 1020, which also comprises one or more memory devices. During performance of a method embodying the present techniques, program steps are fetched from the program storage 1030 and executed by a Central Processing Unit (CPU) 1010, retrieving data as required from the data storage 1020. Output information resulting from performance of a method embodying the presently-described techniques can be stored back in the data storage 1020, or sent to an Input/Output (I/O) interface 1040, which includes a network interface for sending and receiving data to and from other network nodes and which may also include a radio transceiver for communicating with one or more terminal devices.

Accordingly, in various embodiments, processing circuits, such as the CPU 1010 in FIG. 5, are configured to carry out one or more of the techniques described in detail below. Likewise, other embodiments include radio network controllers including one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 6:
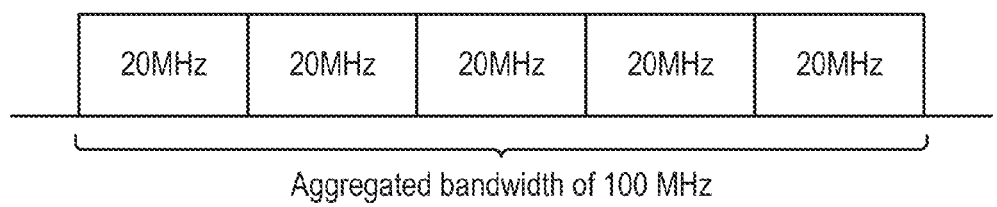
FIG. 6 shows an example of carrier aggregation.

Carrier aggregation—The concept of carrier aggregation is referred to in some of the embodiments described below. Long Term Evolution (LTE) specifications from 3GPP support component carrier bandwidths up to 20 MHz. However, in order to meet the International Mobile Telecommunications Advanced (IMT-Advanced) requirements for very high data rates, the concept of carrier aggregation has been introduced to support bandwidths larger than 20 MHz. The carrier aggregation concept is illustrated in FIG. 6, where five component carriers (also or alternately referred to as cells), are illustrated, each with 20 MHz bandwidth. In the example of FIG. 6, the total bandwidth available to a terminal device is the sum of the bandwidths of the component carriers or cells, i.e. 100 MHz. A terminal device may aggregate carriers from a single base station or from multiple base stations. A terminal device may also aggregate carriers on different frequencies and frequency bands, i.e. not only contiguously as suggested in FIG. 6.

Configuration—A terminal device may be configured with a subset of the cells offered by the network and the number of aggregated cells configured for one terminal device can change dynamically over time based on, for example, the traffic demand of the terminal device, the type of service used by the terminal device, the system (network) load, etc. A cell that a terminal device is configured to use is referred to as a serving cell for that terminal device. A terminal device has one primary serving cell (referred to as a "PCell") and zero or more (currently up to four) secondary serving cells (referred to as "SCells"), and it will be appreciated that the term "serving cell" includes both the PCell and SCells. The cell that is the primary serving cell for a particular terminal device is specific to the terminal device. The PCell is considered more important than the SCells, since, for example, some control signalling is handled via the PCell.

Activation—In addition to the concept of configuration of cells, the concept of activation has been introduced for SCells (but not for the PCell). Cells may be configured (or deconfigured) using Radio Resource Control (RRC) signalling, which can be slow, and at least SCells can be activated (or deactivated) using a Medium Access Control (MAC) control element, which is much faster. Since the activation process is based on MAC control elements—which are much faster than RRC signalling—an activation/de-activation process can quickly adjust the number of activated cells to match the number that are required to fulfil a required data rate at any given time. Activation therefore provides the possibility to keep multiple cells configured for activation on an as-needed basis.

As described above, for a 3GPP/WLAN interworking feature to operate successfully, support is required from the terminal device and the network. The network (e.g. a network node, such as a base station (eNB) or other node (e.g. MME)) should signal some information to the terminal device and the terminal device should follow some rules to determine when to connect to (i.e. access) and/or steer traffic to WLAN and when to connect to and/or steer traffic to 3GPP.

In some scenarios a terminal device which is capable of supporting the 3GPP/WLAN interworking feature may enter a cell that is not capable of supporting the 3GPP/WLAN interworking feature, and in such a scenario it may not be suitable for the terminal device to continue to apply the interworking feature as this could, for example, result in inaccurate or inappropriate access selection decisions. For example the terminal device may in a first cell have received parameters relating to the 3GPP/WLAN interworking feature which would make the terminal device steer traffic to WLAN. This may have been suitable in the first cell, but if the terminal device moves to another cell in which, from a network state point of view, it would be not be suitable to steer traffic to WLAN (i.e. it would be more suitable to steer traffic to 3GPP), the terminal device would still route traffic to WLAN due to the parameters received from the first cell. This inappropriate traffic steering can degrade both user experience and system performance.

Another, somewhat similar case, is that both cells support the 3GPP/WLAN interworking feature, but different parameter settings should be used. Consider for example a scenario where the terminal device moves from a 3GPP cell which has high load where the parameters (due to the high 3GPP load) provided by the cell to the terminal device are set such that the terminal device steers traffic to WLAN whenever possible (to provide improved user experience and system performance in that cell). However, if the terminal device moves to another 3GPP cell which is unloaded or lightly loaded then the 3GPP/WLAN interworking feature would make the terminal device steer traffic to WLAN even though from a user experience and system performance point of view it would have been better if the terminal device steered traffic to the 3GPP cell.

It should be noted that a terminal device may acquire updated interworking feature parameters with a delay after entering (i.e. starting to be served by) a new cell. The updated parameters may be transmitted in System Broadcast, which means the terminal device may acquire only a fraction of the required information before changing the serving cell and the remaining information can take many seconds to acquire. If the information is conveyed via dedicated signalling, then that signalling may be delayed in relation to the change of serving cell. Hence, the terminal device may discover support for, or lack of support for, the 3GPP/WLAN interworking feature, with some delay.

In this document, an example is used in which a terminal device moves from a first cell to a second cell, with the first cell being capable of supporting the 3GPP/WLAN interworking mechanism/feature, while the second cell is not capable of supporting the 3GPP/WLAN interworking mechanism. The first cell may in some places herein be referred to as the old cell (the cell that the terminal device moved from) while the second cell may in some places herein be referred to as the new cell (the cell the terminal device moves to). It will be appreciated, however, that several of the embodiments described below are also applicable to the case where the second (new) cell does support the 3GPP/WLAN interworking feature but with different settings, parameters or configuration to that supported in the first (old) cell.

In these examples, where it is stated that the old cell has configured the terminal device it should be appreciated that it may not necessarily have been the cell with which the terminal device was connected to directly before entering the new cell, it may have been a cell with which the terminal device has been served by prior to that. It may even be the case that different cells have contributed to configuring the terminal device for network interworking. It may also be the case that the terminal device has received WLAN identifiers (e.g. SSIDs) from a cell which it was connected to prior to the old cell, while a different cell may have configured the terminal device with some thresholds.

Being "connected" to WLAN can mean different things, as exemplified by the existence of one or more of the below conditions:

802.11 authentication (Authentication to the WLAN AP) has been completed or is under way;

802.1x Extensible Authentication Protocol (EAP)-Subscriber Identity Module (SIM) authentication (Authentication to the Authentication, Authorisation and Accounting (AAA) and AAA-servers) has been completed or is under way;

Four way hand-shake between the terminal and the WLAN network has been completed;

An IP address has been assigned to the terminal in WLAN;

A packet data network (PDN) connection has been established through the WLAN network, i.e., a connection between the terminal and the PDN gateway;

Data traffic has been started through the WLAN network.

Figure 7:
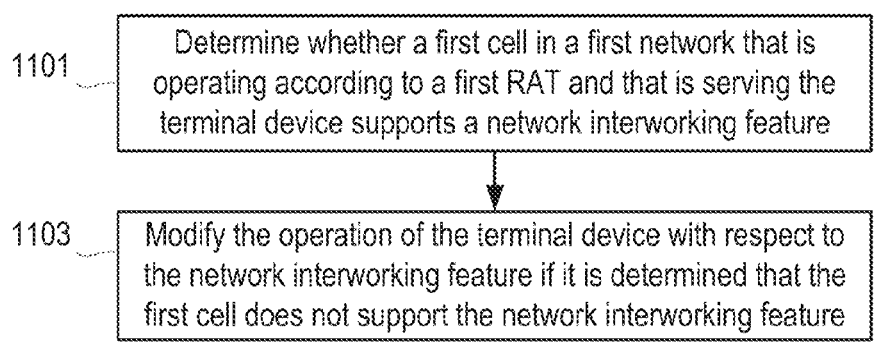
FIG. 7 is a flow chart illustrating a method of operating a terminal device according to some embodiments.

The flow chart in FIG. 7 illustrates a method of operating a terminal device to mitigate the problems with cells not supporting a 3GPP/WLAN interworking feature (or more generally a feature for enabling and controlling interworking between a first network operating according to a first RAT (e.g. a 3GPP RAT) and a network operating according to a second RAT, different to the first RAT (e.g. WLAN)). In a first step, step 1101, when the terminal device is being served by a first cell in the first network, the terminal device determines whether the first cell supports the network interworking feature. Various embodiments of step 1101 are described in more detail below. Step 1101 is typically performed after the terminal device (which may already be acting according to a 3GPP/WLAN interworking feature) starts to be served by the first cell (i.e. following a change in the serving cell to the first cell from another cell due to terminal device mobility).

Then, in step 1103, if it is determined that the first cell (that is now serving the terminal device) does not support the network interworking feature, then the operation of the terminal device according to the network interworking feature is modified. The aim of this modification is to prevent or at least reduce the problems with inappropriate traffic steering caused by continuing to operate according to the network interworking feature without consideration being taken of the fact that the first cell does not support the feature. Various embodiments of step 1103 are described in more detail below.

In some embodiments of the presently disclosed techniques, the terminal device will, when being served by a cell which does not support the 3GPP/WLAN interworking feature, modify its operation to disable or otherwise stop acting according to the 3GPP/WLAN interworking feature.

In some embodiments the terminal device modifies its operation so that it continues to act according to the 3GPP/WLAN interworking feature if one or more conditions are satisfied. Exemplary conditions are described below.

In some embodiments described below, the terminal device modifies its operation so that it continues to act according to the 3GPP/WLAN interworking feature, although the terminal device uses default settings, parameters or configuration of the 3GPP/WLAN interworking feature rather than the settings, parameters or configurations of the 3GPP/WLAN interworking feature that the terminal device was using in the cell that was previously serving the terminal device.

The terms configuration and (set of) parameters may sometimes be used interchangeably herein as in some mechanisms the network will configure the terminal device to act in a certain way and in some mechanisms the network will provide parameters to the terminal device which will be used by the terminal device to determine how to act. An interworking mechanism can even comprise both configurations and parameters.

Conditionally continuing to act according to the interworking feature

The terminal device may continue to act according to the 3GPP/WLAN interworking feature even though the current cell does not support the 3GPP/WLAN interworking feature, provided that certain conditions are fulfilled.

Condition on time—In some embodiments the terminal device is permitted to continue to act according to the 3GPP/WLAN interworking feature for a limited period of time T. The time T could be defined from the time the terminal device entered the non-capable cell (e.g. from when the terminal device performed cell re-selection to that cell, or performed handover to that cell), alternatively the time T could be defined to start from the time that the terminal device received the configuration/parameters from the old cell (which happened before the terminal device changed to being served by the new cell). The time T may be provided by the network, e.g. the old cell, or it may be specified in a 3GPP specification. T may have a value ranging from seconds (e.g. 10 seconds) to hours (e.g. 10 hours).

The old cell may have acquired information about the conditions in the new cell and hence the old cell may, before the terminal device goes from the old to the new cell, provide to the terminal device configuration/parameters which are suitable for the terminal device to use in the new cell. However the conditions in the new cell may change as time passes and the configuration/parameters which the old cell provided to the terminal device may become outdated after a certain time. This time based approach thus ensures that the configuration provided by the old cell is not used indefinitely.

Network indication—In some embodiments, the terminal device can continue to act according to the 3GPP/WLAN interworking feature if the network has indicated this to the terminal device. For example, the old cell may indicate to the terminal device whether the terminal device should continue to act according to the 3GPP/WLAN interworking mechanism when entering the new cell.

Event based condition—The terminal device could continue to act according to the 3GPP/WLAN interworking feature until a certain event has happened.

Figure 8:
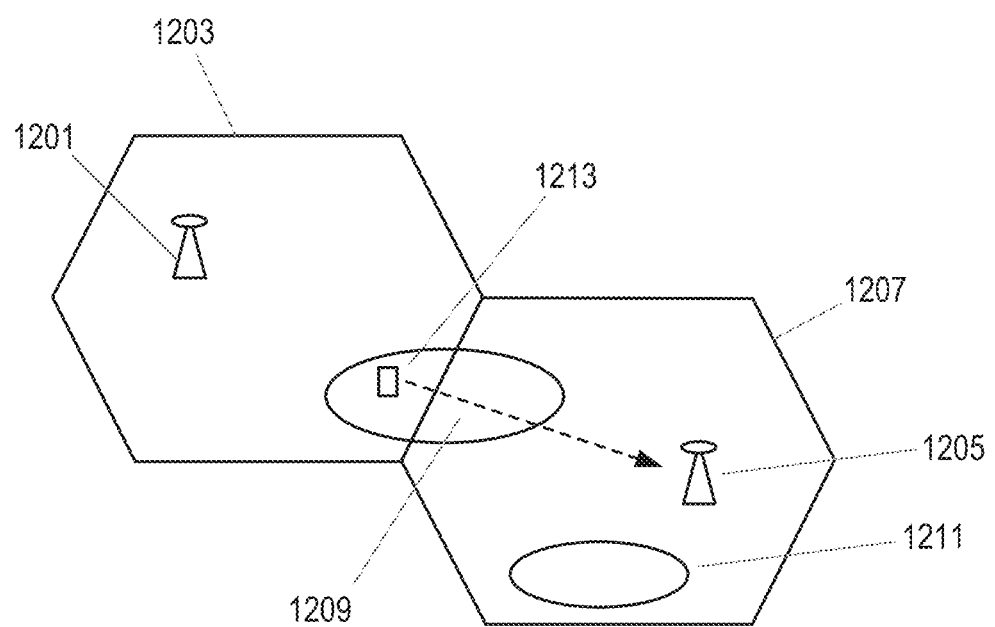
FIGS. 8 and 9 illustrate scenarios in which various embodiments can be applied.

One example event, after which the terminal device should stop acting according to the interworking feature, is that the terminal device disconnects from a WLAN. FIG. 8 illustrates an exemplary scenario in which this may occur. A base station 1201 has a coverage area 1203 referred to as the 'old' cell, and base station 1205 has a coverage area 1207 referred to as the 'new' cell. The old cell 1203 supports the 3GPP/WLAN interworking feature, but new cell 1207 does not. Two WLANs are shown, a first WLAN 1209 that is generally located across the border of the old cell 1203 and the new cell 1207, and a second WLAN 1211 that is located in the new cell 1207. A terminal device 1213 is located in (and served by) the old cell 1203 and is connected to WLAN 1209 (for example following an evaluation that found that WLAN 1209 will provide sufficient user experience for the terminal device 1213). If the terminal device 1213 then changes serving cell to the new cell 1207, it may still be suitable for the terminal device 1213 to continue being connected to WLAN 1209 and hence the terminal device 1213 should keep acting according to the 3GPP/WLAN interworking mechanism.

When the terminal device 1213 disconnects from WLAN 1209 (e.g. if the terminal device 1213 moves further into the new cell 1207 and is out of range of WLAN 1209), it may not be suitable for the terminal device 1213 to connect to another WLAN, e.g. WLAN 1211 (a WLAN which the first cell may not have evaluated and hence may not be able to provide good user experience to the terminal device). Therefore, according to this embodiment, the terminal device 1213 can continue to act according to the 3GPP/WLAN interworking feature (i.e. by being connected to WLAN 1209) until the terminal device 1213 disconnects from WLAN 1209, at which point the terminal device 1213 should stop acting according to the 3GPP/WLAN interworking mechanism to prevent the terminal device 1213 from connecting to the other WLAN 1211.

Another example event is that the terminal device is fast moving, e.g. the mobility state indicates that the UE is in "High-mobility state". The mobility state is defined in 3GPP TS 36.304 v11.6.0 (2013-12) clause 5.2.4.3 or 3GPP TS 25.304 v 12.0.0 (2013-12) clause 5.2.6.1.1a.

Traffic dependent condition—In some embodiments, the terminal device can continue to route traffic flows existing at the time of changing from the old cell to the new cell according to the 3GPP/WLAN interworking feature. However the 3GPP/WLAN interworking feature is not applied to any new traffic flows that arise or start after the serving cell change.

One example where this is beneficial is that the terminal device may have been configured by the old cell to route some traffic which was judged, by the old cell, to be of low priority, and hence can be steered to WLAN. However any new traffic (arising in the new cell) may not be suitable to route over WLAN as the new traffic may not be of low priority (from the new cell's point of view). Therefore, the terminal device should only continue to route the preexisting traffic as per the 3GPP/WLAN interworking mechanism, but any new traffic will be exempt from this mechanism, and the terminal device may apply a default behaviour to this new traffic (exemplary default behaviour is explained below).

Combinations of conditions—In some embodiments, a combination of the above conditions can be applied, which means that each condition must be met in order for the terminal device to continue using the 3GPP/WLAN interworking feature. For example the terminal device may keep acting according to the current 3GPP/WLAN interworking feature as long as it is connected to a WLAN which it connected to while in the old cell (as described in the Event based condition section above), although only for a maximum time T (as described in the Condition on time section above).

In another example the terminal device could keep acting according to the 3GPP/WLAN interworking feature when entering the new cell if the old cell has indicated this (as described in the Network indication section above), but only for traffic which was started while the terminal device was in the old cell (as described in the Traffic dependent condition section above 0).

Network controlled condition handling—Whether the terminal device should conditionally continue to act according to the 3GPP/WLAN interworking mechanism (and if so, which conditions should be applied) can be preset in the terminal device or configured by the network. This configuration could occur while the terminal device is being served by the old cell or a cell the terminal device was connected to earlier. This configuration could be determined by a network node, such as a node in the core network, such as the mobility management entity, MME, which decides and indicates to the terminal device whether the terminal device should conditionally continue to act according to the 3GPP/WLAN interworking feature and also which conditions should be applied.

For example in the case where the terminal device continues to act according to the 3GPP/WLAN interworking mechanism until the terminal device disconnects from a particular WLAN, if the old cell is able to create and provide to the terminal device a suitable configuration for the terminal device which can be used as long as the terminal device is connected to the particular WLAN, then the old cell can also indicate to the terminal device that the terminal device should continue to act according to the 3GPP/WLAN interworking feature until it has disconnected from the particular WLAN.

Default Behaviour

As noted above, in some embodiments the terminal device modifies its operation so that it stops acting according to the configured 3GPP/WLAN interworking feature when it is being served by a cell that does not support the 3GPP/WLAN interworking feature, and uses default settings, parameters or configuration of the 3GPP/WLAN interworking feature instead. The default behaviour may be specified in a 3GPP specification. Examples of such default behaviours are shown below. Which default behaviour is applied could be determined based on some criteria. For example, if the terminal device has a valid ANDSF policy, the terminal device may apply this ANDSF policy, otherwise the terminal device may apply autonomous behaviour.

Default configuration—One default behaviour is that the terminal device continues to act according to the 3GPP/WLAN interworking feature but the terminal device applies some default parameters/configuration when applying the 3GPP/WLAN interworking mechanism.

The default parameters could be, for example, default thresholds which may be set such that the terminal device will only connect to a WLAN if the WLAN conditions are very good (i.e. the thresholds are set to require a high signal quality in the WLAN before the terminal device can steer traffic to the WLAN). This would allow the terminal device to connect to WLANs, but only if there is a small risk of degradation of user experience.

It would also be possible for the terminal device to consider only a default set of WLAN identifiers (e.g. SSIDs). As explained above, the terminal device may consider WLANs with WLAN identifiers signalled, for example, by the 3GPP RAN. However if the terminal device is in a cell which does not support the 3GPP/WLAN interworking feature then the cell may not be able to provide WLAN identifiers to the terminal device, and WLAN identifiers provided to the terminal device while the terminal device was in an old cell may not be applicable in the current cell. Therefore the terminal device may only consider some default WLAN identifiers. For example a network operator may have a main WLAN network which spans a large region such as a whole country or city, and the network operator may also have more local WLAN deployments, for example in a train station there could be WLANs which can be accessed by the terminal devices. In this scenario it may be suitable for the terminal device to consider the operator's main WLAN network even though the current cell is not capable of supporting the 3GPP/WLAN interworking feature.

Another example of a default parameter for the 3GPP/WLAN interworking mechanism which the terminal device could apply while being served by a non-capable cell is a parameter used to determine traffic steering. This parameter could be set such that only some traffic with loose quality of service requirements (e.g. internet browsing) can be steered to WLAN while some traffic with stricter quality of service requirements (e.g. voice traffic) should not be steered to WLAN. Default parameters for traffic steering like this will ensure that the terminal device will not risk that the traffic with strict requirements is steered to WLAN while being in the non-capable cell.

Refrain from connecting to WLAN—Another default behaviour is that the terminal device refrains from connecting to WLAN when in a cell that does not support the 3GPP/WLAN interworking feature.

In some embodiments, the WLANs the terminal device would refrain from connecting to could be different. One possibility is that the terminal device will refrain from connecting to any WLAN. Another possibility is that the terminal device will only refrain from connecting to certain types of WLAN, e.g. WLANs operated by the same network operator as the 3GPP network (e.g. indicated by the RAN, ANDSF or by some other means such as in the SIM card), while still connecting to other WLANs if determined suitable by some mechanism.

Figure 9:
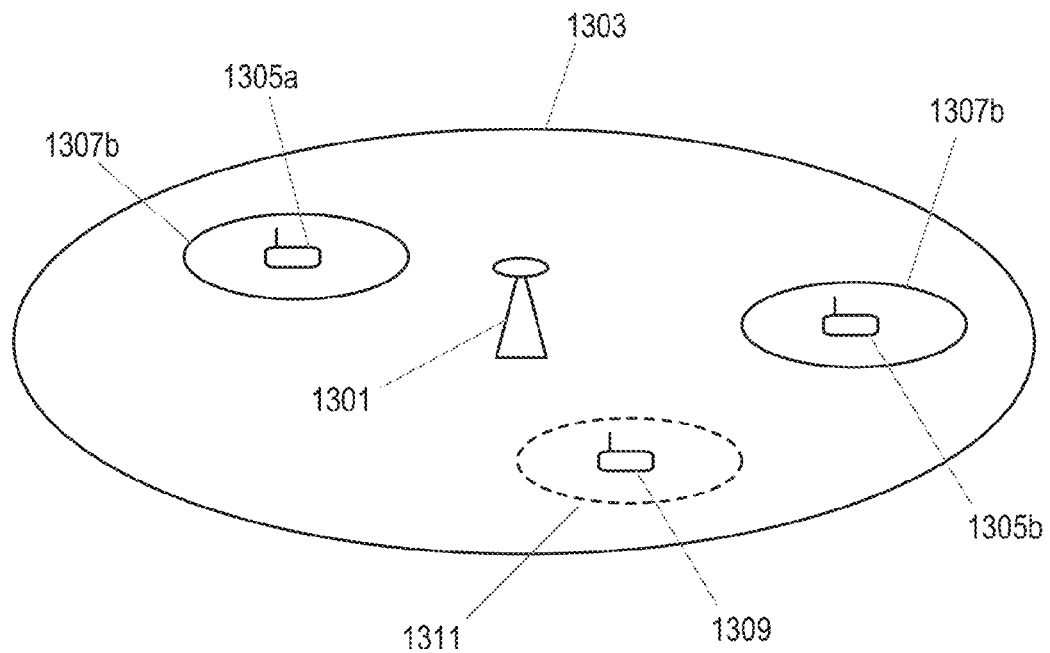

Consider the exemplary scenario illustrated in FIG. 9. This Figure shows a base station 1301 with coverage area (cell) 1303, two WLANs 1305*a*, 1305*b* (with respective coverage areas 1307*a*, 1307*b*) that are controlled by the same network operator as base station 1301 and WLAN 1309 with coverage area 1311 that is operated by a different network operator to the other two WLANs (and may, for example, be a home WLAN of the terminal device). In this scenario, if the cell 1303 is not capable of supporting the 3GPP/WLAN interworking feature the terminal device may refrain from connecting to the operator WLANs 1305*a*, 1305*b*, however the terminal device may still be permitted to connect to the home WLAN 1309 (which may be preferred by the user of the terminal device) if the terminal device, by some mechanism or user preference, considers it suitable.

Autonomous behaviour—Another default behaviour is that the terminal device autonomously decides (e.g. based on terminal device implementation) when to connect to WLAN. The terminal device may comprise a so-called "connection manager" which is an entity that controls whether the terminal device should connect to WLAN or not.

Applying ANDSF—In another embodiment the terminal device may apply an ANDSF policy to decide when to connect to and/or steer traffic to WLAN if the serving cell does not support the 3GPP/WLAN interworking feature.

Determining of Cell Capability

The following section provides various different ways in which the terminal device can determine whether a cell (or cells in some cases) is capable of supporting the 3GPP/WLAN interworking feature.

Implicit indication—In some embodiments the terminal device can determine whether the cell is capable of supporting the 3GPP/WLAN interworking feature by determining if the network has provided parameters/configurations related to the 3GPP/WLAN interworking feature. For example if the cell has provided thresholds to be used in the interworking feature, the terminal device can consider the cell to be capable of supporting the 3GPP/WLAN interworking feature.

If the terminal device has not received any parameters/configuration from the 3GPP network/serving cell, it could be that the cell supports an earlier 3GPP release (i.e. one that does not support the interworking feature or does not support the version of the interworking feature implemented by the terminal device) or that the cell supports a recent 3GPP release, but the 3GPP/WLAN interworking feature is disabled in the cell. The detailed detection mechanism differs for the two cases. Where transmitted, the parameters/configurations may be broadcast or sent to the terminal device with dedicated signalling.

Explicit indication—In other embodiments the terminal device can consider the cell to be capable of supporting the 3GPP/WLAN interworking feature if the terminal device receives an explicit indication of this. This embodiment is particularly beneficial in the case where the 3GPP/WLAN interworking feature uses dedicated signalling to signal the parameters/configurations related to the feature to the terminal device, since otherwise the terminal device would not know before receiving such parameters/configurations whether the cell is capable of supporting the interworking feature or not.

The explicit indication from the network could be broadcast in the form of a flag in a broadcast message and the terminal device would then know when receiving this flag/indication that the cell is capable of supporting the interworking feature and of sending the parameters/configurations related to this feature.

For example, if a terminal device enters a Cell X and Cell X does not broadcast any parameters related to an interworking feature, then the terminal device would not know if Cell X is capable of supporting the interworking feature or not. However Cell X may, according to this embodiment, broadcast a flag indicating that Cell X is capable of supporting this feature and hence the terminal device can expect that, if Cell X deems necessary at a later stage, Cell X will provide updated parameters to the terminal device relating to this feature.

Terminal behaviour prior to reception of implicit/explicit indication—In some embodiments, prior to the terminal device having determined whether the serving cell supports the interworking feature, the terminal device can be configured to assume that the 3GPP/WLAN interworking feature is not supported by the cell and act as if the cell does not support the feature (e.g. by applying one or more of the modifications described above).

For example, where the terminal device determines whether the current cell supports the interworking feature or not by determining whether it has received dedicated signalling information related to the interworking feature then the terminal device may assume that the cell is not capable of supporting the 3GPP/WLAN interworking feature until such information is received.

In the case that the terminal device determines the capability of the cell supporting the feature based on a broadcast explicit indication, then it may be so that the frequency of such broadcast explicit indication is low, e.g. only signalled once every 10 seconds, and hence the terminal device may not know the cell capability for up to 10 seconds.

With this embodiment the terminal device can assume that the cell does not support the feature until the time when it is expected that the indication should have been signalled.

Figure 10:
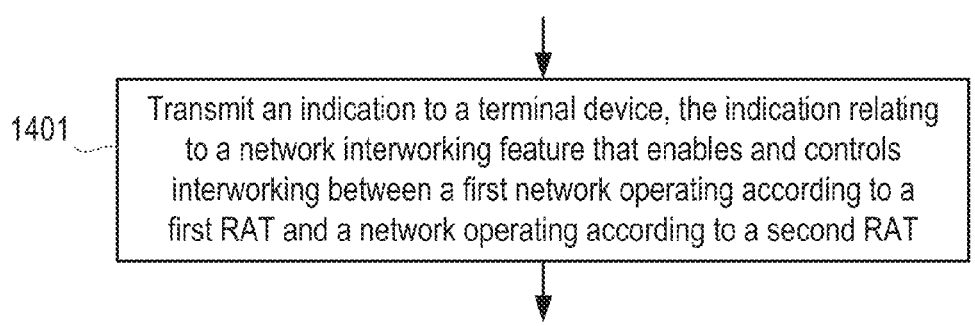
FIG. 10 is a flow chart illustrating a method of operating a network node according to some embodiments.

The flow chart in FIG. 10 illustrates a general method of operating a network node according to some of the above embodiments. The method can be implemented in a base station, such as a NodeB or eNodeB, or another type of network node, such as a mobility management entity. In step 1401, the network node transmits an indication to a terminal device, the indication relating to a network interworking feature that enables and controls interworking between the network in which the network node operates and a network operating according to another RAT, such as a WLAN.

As described above, in some embodiments the indication comprises one or more conditions that are to be met in order for the terminal device to continue operating according to the network interworking feature in the event that the terminal device is served by a cell that does not support the network interworking feature. In other embodiments the indication comprises settings or parameters for the network interworking feature for use by the terminal device. In other embodiments the indication comprises a flag indicating that the network node supports the network interworking feature.

Multi Cell Handling

The above embodiments describe how a terminal device considers a cell to be capable or non-capable of supporting a 3GPP/WLAN interworking feature and it has been described how the terminal device should act in case the terminal device is served by a cell not capable of supporting the feature. However, features such as Carrier Aggregation and Dual Connectivity in LTE and multi-carrier in UMTS provide the possibility for a terminal device to be served by multiple cells simultaneously, and in these multi-cell scenarios the terminal device may determine network capability of 3GPP/WLAN interworking, and if the network is not capable of supporting the feature (at all or as currently implemented by the terminal device) then the embodiments described in this document can be applied.

In one embodiment the terminal device can consider the network to be capable of supporting the interworking feature if at least one of the serving cells is considered capable of supporting the feature. For example if in Carrier Aggregation a terminal device is served by Cell A and Cell B, with Cell A being capable of supporting the feature and Cell B not being capable of supporting the feature, then the terminal device can consider the network to be capable of supporting the 3GPP/WLAN interworking feature and hence it would apply the 3GPP/WLAN interworking feature as normal for the terminal device. One scenario where this embodiment is beneficial is where the terminal device is served by one macro cell and one cell from a Remote Radio Head (RRH) where the macro cell base station has been upgraded to support the 3GPP/WLAN interworking feature, but the Remote Radio Head cell has not been upgraded to support the feature. In this case the terminal device would consider the network to be capable of supporting the feature. However if neither of the cells are capable of supporting the interworking feature then the terminal device would not consider the network to be capable of supporting the feature. In one variant of this embodiment, the terminal device can consider the network to be capable of supporting the feature if one specific cell is capable of supporting the feature. This one specific cell can be the Primary Cell in Carrier Aggregation, which means that the terminal device can consider the network capable of supporting the feature if the Primary Cell is capable of the feature, but otherwise considering the network not to be capable of supporting the feature, regardless of whether any Secondary cells support the feature.

It should be noted that in multi-cell scenarios, the terminal device may receive the information which is broadcast in a cell through dedicated signalling in a (possibly other) serving cell. In Carrier Aggregation for example, the terminal device will receive the system information for Secondary Cells (which normally is acquired from the broadcast channel) through dedicated signalling over the Primary cell.

In some multi-cell mechanisms, such as Carrier Aggregation, serving cells can be dynamically activated and deactivated for the terminal device. In one embodiment the terminal device can determine the network capability of supporting the feature based only on the capability of the serving cells which are activated, and disregard serving cells which are deactivated. For example if a terminal device has three serving cells; Cell A, Cell B and Cell C, out of which only Cell A is considered (according to the above described procedures) capable of supporting the 3GPP/WLAN interworking feature, while Cell B and Cell C are not considered capable of supporting the feature, then the terminal device may only consider the network capable of supporting the 3GPP/WLAN interworking feature if Cell A is activated. So if Cell A initially is activated for the terminal device the terminal device may consider the network capable of supporting the 3GPP/WLAN interworking feature, but if Cell A later gets deactivated the terminal device may consider the network not capable of supporting the feature (as none of the activated cells are considered capable of supporting the feature).

The above embodiments provide mechanisms for preventing a terminal device from applying a 3GPP/WLAN interworking feature with an unsuitable configuration while being served by cells that are not capable of supporting the 3GPP/WLAN interworking feature.

It will be appreciated by the person of skill in the art that various modifications may be made to the above described embodiments without departing from the scope of the teaching of the present application. For example, it will be readily appreciated that although the above embodiments are described with reference to parts of a 3GPP network, embodiments will also be applicable to like networks, such as a successor of any current 3GPP network, having like functional components. Therefore, in particular, the terms 3GPP and associated or related terms used in the above description and in the enclosed drawings now or in the future are to be interpreted accordingly.

Examples of several embodiments have been described in detail above, with reference to the attached illustrations of specific embodiments. Because it is not possible, of course, to describe every conceivable combination of components or techniques, those skilled in the art will appreciate that the present techniques can be implemented in other ways than those specifically set forth herein, without departing from essential characteristics of the teaching of this application. The present embodiments, and the embodiments set out in the following paragraphs, are thus to be considered in all respects as illustrative and not restrictive.

Embodiments

1. A method of operating a terminal device in a first network that is operating according to a first radio access technology, RAT, the terminal device supporting and operating according to a network interworking feature that enables and controls interworking between the first network and a network operating according to a second RAT, the method comprising:
 determining whether a first cell in the first network that is serving the terminal device supports the network interworking feature; and
 modifying the operation of the terminal device with respect to the network interworking feature if it is determined that the first cell does not support the network interworking feature.

2. A method as defined in embodiment 1, the method further comprising continuing to operate according to the network interworking feature if it is determined that the first cell does support the network interworking feature.

3. A method as defined in embodiment 1 or 2, wherein the step of modifying the operation of the terminal device comprises disabling the network interworking feature or ceasing to act according to the network interworking feature.

4. A method as defined in embodiment 1 or 2, wherein the step of modifying the operation of the terminal device comprises using default settings or parameters for the network interworking feature.

5. A method as defined in embodiment 4, wherein the default settings or parameters for the network interworking feature comprises any one or more of:
 identifiers of suitable networks operating according to the second RAT that the terminal device can access and steer traffic to;
 thresholds used by the terminal device to determine whether to access a network operating according to the second RAT; and
 types of traffic that can the terminal device can steer to a network operating according to the second RAT.

6. A method as defined in embodiment 4 or 5, wherein the step of modifying the operation of the terminal device comprises refraining from accessing a network operating according to the second RAT.

7. A method as defined in embodiment 4 or 5, wherein the step of modifying the operation of the terminal device comprises refraining from accessing a network operating according to the second RAT that is operated by or associated with the same network operator as the first network.

8. A method as defined in embodiment 4, 5, 6 or 7, wherein the default settings or parameters for the network interworking features are defined in a standard or specified in an Access Network Discovery and Selection Function, ANDSF, policy for the terminal device.

9. A method as defined in embodiment 4, wherein the step of modifying the operation of the terminal device comprises the terminal device determining a network to access and steer traffic to independently of the network interworking feature.

10. A method as defined in embodiment 1 or 2, wherein the step of modifying the operation of the terminal device comprises continuing to operate according to the network interworking feature provided one or more conditions are met.

11. A method as defined in embodiment 10, wherein the one or more conditions comprises a predetermined time period and the terminal device continues to operate according to the network interworking feature until the terminal device has been served by the first cell for longer than the predetermined time period.

12. A method as defined in embodiment 10, wherein the one or more conditions comprises a predetermined time period and the terminal device continues to operate according to a current configuration of the network interworking feature for up to the predetermined time period from the receipt of the current configuration.

13. A method as defined in embodiment 10, 11 or 12, wherein the step of modifying the operation of the terminal device comprises continuing to operate according to the network interworking feature if the terminal device receives an indication to do so from the first network.

14. A method as defined in embodiment 10, 11, 12 or 13, wherein the one or more conditions comprises an event, and the step of modifying the operation of the terminal device comprises continuing to operate according to the network interworking feature until the event has occurred.

15. A method as defined in embodiment 14, wherein the event comprises:
 the terminal device disconnecting from a network operating according to the second RAT; or
 the terminal device being considered to be fast moving.

16. A method as defined in any of embodiments 10-15, wherein the one or more conditions relates to existing traffic flows to a network operating according to the second RAT, and the step of modifying the operation of the terminal device comprises continuing to route the existing traffic flow to the network operating according to the second RAT, and refraining from routing new traffic flows to the network operating according to the second RAT.

17. A method as defined in any of embodiments 10-16, the method further comprising the step of:
receiving an indication from the first network of the one or more conditions that are to be met in order for the terminal device to continue operating according to the network interworking feature if it is determined that the first cell does not support the network interworking feature.

18. A method as defined in any preceding embodiment, wherein the step of determining whether a first cell in the first network that is serving the terminal device supports the network interworking feature comprises:
determining whether the terminal device has received settings or parameters for the network interworking feature from the first cell.

19. A method as defined in any of embodiments 1 to 17, wherein the step of determining whether a first cell in the first network that is serving the terminal device supports the network interworking feature comprises:
determining whether the terminal device has received a flag in broadcast or dedicated signalling from the first cell, the flag indicating that the first cell supports the network interworking feature.

20. A method as defined in any preceding embodiment, wherein in the event that the terminal device is being served by a plurality of cells in the first network, the step of determining whether a first cell in the first network that is serving the terminal device supports the network interworking feature further comprises determining whether at least one of the plurality of cells supports the network interworking feature; and the step of modifying is performed if it is determined that none of the plurality of cells support the network interworking feature.

21. A method as defined in any of embodiments 1-19, wherein in the event that the terminal device is being served by a plurality of cells in the first network, with a subset of the plurality of cells being active for the terminal device, the step of determining whether a first cell in the first network that is serving the terminal device supports the network interworking feature further comprises determining whether at least one of the subset of active cells supports the network interworking feature; and the step of modifying is performed if it is determined that none of the subset of active cells support the network interworking feature.

22. A method as defined in any of embodiments 1-19, wherein in the event that the terminal device is being served by a plurality of cells in the first network, the step of determining whether a first cell in the first network that is serving the terminal device supports the network interworking feature comprises determining whether a primary cell of the plurality of cells supports the network interworking feature; and the step of modifying is performed if it is determined that the primary cell does not support the network interworking feature.

23. A method as defined in any preceding embodiment, wherein the step of determining whether a first cell in the first network that is serving the terminal device supports the network interworking feature is performed following a change in the serving cell of the terminal device from another cell in the first network.

24. A method as defined in any preceding embodiment, wherein the first network is operating according to a 3GPP-standardised RAT and the second RAT is a wireless local area network, WLAN.

25. A method as defined in embodiment 24, wherein the 3GPP-standardised RAT is one of Long-Term Evolution, LTE, Universal Mobile Telecommunications System, UMTS/Wideband Code-Division Multiple Access, WCDMA, High Speed Packet Access, HSPA, and Global System for Mobile Communications, GSM.

26. A computer program product having computer readable code embodied therein, the computer readable code being configured such that, on execution by a suitable processing circuit or computer, the processing circuit or computer is caused to perform the method of any of embodiments 1-25.

27. A terminal device for use in a first network that is operating according to a first radio access technology, RAT, the terminal device supporting and operating according to a network interworking feature that enables and controls interworking between the first network and a network operating according to a second RAT, the terminal device comprising:
a processing circuit that is configured to:
determine whether a first cell in the first network that is serving the terminal device supports the network interworking feature; and
modify the operation of the terminal device with respect to the network interworking feature if it is determined that the first cell does not support the network interworking feature.

28. A terminal device as defined in embodiment 27, wherein the processing circuit is further configured to continue to operate the terminal device according to the network interworking feature if it is determined that the first cell does support the network interworking feature.

29. A terminal device as defined in embodiment 27 or 28, wherein the processing circuit is configured to modify the operation of the terminal device by disabling the network interworking feature or ceasing to act according to the network interworking feature.

30. A terminal device as defined in embodiment 27 or 28, wherein the processing circuit is configured to modify the operation of the terminal device to use default settings or parameters for the network interworking feature.

31. A terminal device as defined in embodiment 30, wherein the default settings or parameters for the network interworking feature comprises any one or more of:
identifiers of suitable networks operating according to the second RAT that the terminal device can access and steer traffic to;
thresholds used by the terminal device to determine whether to access a network operating according to the second RAT; and
types of traffic that can the terminal device can steer to a network operating according to the second RAT.

32. A terminal device as defined in embodiment 30 or 31, wherein the processing circuit is configured to modify the operation of the terminal device to refrain from accessing a network operating according to the second RAT.

33. A terminal device as defined in embodiment 30 or 31, wherein the processing circuit is configured to modify the operation of the terminal device to refrain from accessing a network operating according to the second RAT that is operated by or associated with the same network operator as the first network.

34. A terminal device as defined in any of embodiments 30-33, wherein the default settings or parameters for the network interworking features are defined in a standard or specified in an Access Network Discovery and Selection Function, ANDSF, policy for the terminal device.

35. A terminal device as defined in embodiment 30, wherein the processing circuit is configured to modify the operation of the terminal device to determine a network to access and steer traffic to independently of the network interworking feature.

36. A terminal device as defined in embodiment 27 or 28, wherein the processing circuit is configured to modify the operation of the terminal device such that the terminal device continues to operate according to the network interworking feature provided one or more conditions are met.

37. A terminal device as defined in embodiment 36, wherein the one or more conditions comprises a predetermined time period and the processing circuit is configured to continue to operate the terminal device according to the network interworking feature until the terminal device has been served by the first cell for longer than the predetermined time period.

38. A terminal device as defined in embodiment 36, wherein the one or more conditions comprises a predetermined time period and the processing circuit is configured to continue to operate the terminal device according to a current configuration of the network interworking feature for up to the predetermined time period from the receipt of the current configuration.

39. A terminal device as defined in embodiment 36, 37 or 38, wherein the processing circuit is configured to modify the operation of the terminal device such that the terminal device continues to operate according to the network interworking feature if the terminal device receives an indication to do so from the first network.

40. A terminal device as defined in embodiment 36, 37, 38 or 39, wherein the one or more conditions comprises an event, and the processing circuit is configured to modify the operation of the terminal device such that the terminal device continues to operate according to the network interworking feature until the event has occurred.

41. A terminal device as defined in embodiment 40, wherein the event comprises:
the terminal device disconnecting from a network operating according to the second RAT; or
the terminal device being considered to be fast moving.

42. A terminal device as defined in any of embodiments 36-41, wherein the one or more conditions relates to existing traffic flows to a network operating according to the second RAT, and the processing circuit is configured to modify the operation of the terminal device such that the terminal device continues to route the existing traffic flow to the network operating according to the second RAT, and refrains from routing new traffic flows to the network operating according to the second RAT.

43. A terminal device as defined in any of embodiments 36-42, wherein the processing circuit is further configured to receive an indication from the first network of the one or more conditions that are to be met in order for the terminal device to continue operating according to the network interworking feature if it is determined that the first cell does not support the network interworking feature.

44. A terminal device as defined in any of embodiments 27-43, wherein the processing circuit is configured to determine whether a first cell in the first network that is serving the terminal device supports the network interworking feature by determining whether the terminal device has received settings or parameters for the network interworking feature from the first cell.

45. A terminal device as defined in any of embodiments 27-43, wherein the processing circuit is configured to determine whether a first cell in the first network that is serving the terminal device supports the network interworking feature comprises determining whether the terminal device has received a flag in broadcast or dedicated signalling from the first cell, the flag indicating that the first cell supports the network interworking feature.

46. A terminal device as defined in any of embodiments 27-45, wherein in the event that the terminal device is being served by a plurality of cells in the first network, the processing circuit is configured to determine whether at least one of the plurality of cells supports the network interworking feature; and the processing circuit is configured to modify the operation of the terminal device if it is determined that none of the plurality of cells support the network interworking feature.

47. A terminal device as defined in any of embodiments 27-45, wherein in the event that the terminal device is being served by a plurality of cells in the first network, with a subset of the plurality of cells being active for the terminal device, the processing circuit is configured to determine whether at least one of the subset of active cells supports the network interworking feature; and the wherein the processing circuit is configured to modify the operation of the terminal device if it is determined that none of the subset of active cells support the network interworking feature.

48. A terminal device as defined in any of embodiments 27-45, wherein in the event that the terminal device is being served by a plurality of cells in the first network, the processing circuit is configured to determine whether a first cell in the first network that is serving the terminal device supports the network interworking feature by determining whether a primary cell of the plurality of cells supports the network interworking feature; and the processing circuit is configured to modify the operation of the terminal device if it is determined that the primary cell does not support the network interworking feature.

49. A terminal device as defined in any of embodiments 27-48, wherein the processing circuit is configured to determine whether the first cell in the first network that is serving the terminal device supports the network interworking feature following a change in the serving cell of the terminal device from another cell in the first network.

50. A terminal device as defined in any of embodiments 27-49, wherein the first network is operating according to a 3GPP-standardised RAT and the second RAT is a wireless local area network, WLAN.

51. A terminal device as defined in embodiment 50, wherein the 3GPP-standardised RAT is one of Long-Term Evolution, LTE, Universal Mobile Telecommunications System, UMTS/Wideband Code-Division Multiple Access, WCDMA, High Speed Packet Access, HSPA, and Global System for Mobile Communications, GSM.

52. A method of operating a network node in a first network that is operating according to a first radio access technology, RAT, the method comprising:
transmitting an indication to a terminal device, the indication relating to a network interworking feature that enables and controls interworking between the first network and a network operating according to a second RAT.

53. A method as defined in embodiment 52, wherein the indication comprises one or more conditions that are to be met in order for the terminal device to continue operating according to the network interworking feature in the event that the terminal device is served by a cell that does not support the network interworking feature.

54. A method as defined in embodiment 52 or 53, wherein the indication comprises settings or parameters for the network interworking feature for use by the terminal device.

55. A method as defined in embodiment 52, 53 or 54, wherein the indication comprises a flag indicating that the network node supports the network interworking feature.

56. A method as defined in any of embodiments 52-55, wherein the first network is operating according to a 3GPP-standardised RAT and the second RAT is a wireless local area network, WLAN.

57. A method as defined in embodiment 56, wherein the 3GPP-standardised RAT is one of Long-Term Evolution, LTE, Universal Mobile Telecommunications System, UMTS/Wideband Code-Division Multiple Access, WCDMA, High Speed Packet Access, HSPA, and Global System for Mobile Communications, GSM.

58. A network node for use in a first network that is operating according to a first radio access technology, RAT, the network node comprising:
a processing circuit that is configured to transmit an indication to a terminal device, the indication relating to a network interworking feature that enables and controls interworking between the first network and a network operating according to a second RAT.

59. A network node as defined in embodiment 58, wherein the indication comprises one or more conditions that are to be met in order for the terminal device to continue operating according to the network interworking feature in the event that the terminal device is served by a cell that does not support the network interworking feature.

60. A network node as defined in embodiment 58 or 59, wherein the indication comprises settings or parameters for the network interworking feature for use by the terminal device.

61. A network node as defined in embodiment 58, 59 or 60, wherein the indication comprises a flag indicating that the network node supports the network interworking feature.

62. A network node as defined in any of embodiments 58-61, wherein the first network is operating according to a 3GPP-standardised RAT and the second RAT is a wireless local area network, WLAN.

63. A network node as defined in embodiment 62, wherein the 3GPP-standardised RAT is one of Long-Term Evolution, LTE, Universal Mobile Telecommunications System, UMTS/Wideband Code-Division Multiple Access, WCDMA, High Speed Packet Access, HSPA, and Global System for Mobile Communications, GSM.

The invention claimed is:

1. A method of operating a terminal device in a first network that is operating according to a first radio access technology (RAT), the terminal device supporting and operating according to a network interworking feature that enables and controls interworking between the first network and a network operating according to a second RAT, the method comprising, in the terminal device:

determining whether a first cell in the first network that is serving the terminal device supports the network interworking feature; and
modifying the operation of the terminal device with respect to the network interworking feature if it is determined that the first cell does not support the network interworking feature, wherein modifying the operation of the terminal device comprises disabling the network interworking feature or ceasing to act according to the network interworking feature.

2. The method of claim 1, wherein modifying the operation of the terminal device comprises refraining from accessing a network operating according to the second RAT.

3. The method of claim 1, wherein modifying the operation of the terminal device comprises refraining from accessing a network operating according to the second RAT that is operated by or associated with the same network operator as the first network.

4. The method of claim 1, wherein modifying the operation of the terminal device comprises the terminal device determining a network to access and steer traffic to independently of the network interworking feature.

5. The method of claim 1, wherein determining whether a first cell in the first network that is serving the terminal device supports the network interworking feature comprises determining whether the terminal device has received settings or parameters for the network interworking feature for the first cell.

6. The method of claim 1, wherein determining whether a first cell in the first network that is serving the terminal device supports the network interworking feature comprises determining whether the terminal device has received a flag in broadcast or dedicated signaling for the first cell, the flag indicating that the first cell supports the network interworking feature.

7. A terminal device for use in a first network that is operating according to a first radio access technology (RAT), the terminal device supporting and operating according to a network interworking feature that enables and controls interworking between the first network and a network operating according to a second RAT, the terminal device comprising:
a processing circuit that is configured to:
determine whether a first cell in the first network that is serving the terminal device supports the network interworking feature; and
modify the operation of the terminal device with respect to the network interworking feature if it is determined that the first cell does not support the network interworking feature, wherein the operation of the terminal device is modified by disabling the network interworking feature or ceasing to act according to the network interworking feature.

8. The terminal device of claim 7, wherein the processing circuit is configured to modify the operation of the terminal device to refrain from accessing a network operating according to the second RAT.

9. The terminal device of claim 7, wherein the processing circuit is configured to modify the operation of the terminal device to refrain from accessing a network operating according to the second RAT that is operated by or associated with the same network operator as the first network.

10. The terminal device of claim 7, wherein the processing circuit is configured to modify the operation of the terminal device to determine a network to access and steer traffic to independently of the network interworking feature.

11. A method of operating a network node in a first network that is operating according to a first radio access technology (RAT), the method comprising:
  transmitting an indication to a terminal device, the indication relating to a network interworking feature that enables and controls interworking between the first network and a network operating according to a second RAT, wherein the indication comprises one or more conditions that are to be met in order for the terminal device to continue operating according to the network interworking feature in the event that the terminal device is served by a cell that does not support the network interworking feature.

12. The method of claim 11, wherein the indication comprises settings or parameters for the network interworking feature for use by the terminal device.

13. A network node for use in a first network that is operating according to a first radio access technology (RAT) the network node comprising:
  a processing circuit that is configured to transmit an indication to a terminal device, the indication relating to a network interworking feature that enables and controls interworking between the first network and a network operating according to a second RAT, wherein the indication comprises one or more conditions that are to be met in order for the terminal device to continue operating according to the network interworking feature in the event that the terminal device is served by a cell that does not support the network interworking feature.

14. A non-transitory computer-readable medium comprising, stored thereupon, a computer program product having computer readable code embodied therein, the computer readable code being configured such that, on execution by a suitable processing circuit of a terminal device in a first network that is operating according to a first radio access technology (RAT), the terminal device supporting and operating according to a network interworking feature that enables and controls interworking between the first network and a network operating according to a second RAT, the processing circuit is caused to:
  determine whether a first cell in the first network that is serving the terminal device supports the network interworking feature; and
  modify the operation of the terminal device with respect to the network interworking feature if it is determined that the first cell does not support the network interworking feature, wherein the operation of the terminal device is modified by disabling the network interworking feature or ceasing to act according to the network interworking feature.

* * * * *